United States Patent
Gumbert (10) Patent No.: US 10,597,825 B2
(45) Date of Patent: *Mar. 24, 2020

(54) APPARATUS FOR FORMING BLANKS FROM FIBROUS MATERIAL

(71) Applicant: Henry Molded Products Inc., Lebanon, PA (US)

(72) Inventor: Ian Gumbert, Mount Gretna, PA (US)

(73) Assignee: Henry Molded Products, Inc., Lebanon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/887,445

(22) Filed: Feb. 2, 2018

(65) Prior Publication Data

US 2018/0155878 A1 Jun. 7, 2018

Related U.S. Application Data (63) Continuation of application No. 15/097,405, filed on Apr. 13, 2016, now Pat. No. 9,988,767.

(51) Int. Cl.
*D21J 7/00* (2006.01)
*D21H 27/18* (2006.01)
(Continued)

(52) U.S. Cl.
CPC .............. *D21J 7/00* (2013.01); *D21H 27/18* (2013.01); *E04B 2/88* (2013.01); *E04F 13/072* (2013.01); *E04F 13/08* (2013.01); *E04F 13/0871* (2013.01); *E04F 13/0875* (2013.01); *E04F 13/165* (2013.01); *E04F 13/185* (2013.01); *B29C 51/10* (2013.01); *B29C 2791/006* (2013.01); *B29K 2003/00* (2013.01); *B29K 2105/12* (2013.01); *B29L 2031/102* (2013.01); *B29L 2031/104* (2013.01);
(Continued)

(58) Field of Classification Search
USPC ......................................................... 162/382
See application file for complete search history.

(56) References Cited

U.S. PATENT DOCUMENTS

| | | | |
|---|---|---|---|
| 2,377,864 A | 6/1945 | Chaplin |
| 2,847,721 A | 8/1958 | Diamond |
| 2,961,043 A | 11/1960 | Hicks |
| 3,325,302 A | 6/1967 | Hosfeld |
| 3,795,721 A | 3/1974 | Gilbert et al. |
| 4,275,540 A | 6/1981 | Keller |

(Continued)

FOREIGN PATENT DOCUMENTS

AU 2009208100 A1 3/2010

OTHER PUBLICATIONS

Pulp Art Surfaces Catalog, Faux brick, stone, cement block surface panels 100% recycled materials, http://pulpartsurfaces.com/product-line/catalog,Copyright 2011, 10 pages.
(Continued)

*Primary Examiner* — Mark Halpern
(74) *Attorney, Agent, or Firm* — Barley Snyder (57) ABSTRACT

An apparatus for forming blanks from fibrous material is disclosed. The apparatus includes a die having a porous body with a plurality of perforations extending there through, the plurality of perforations having varying sizes and being layered from a top surface to a bottom surface of the porous body. A smooth molding surface is provided on the top surface to hold the fibrous material and allow water to drain from the fibrous material through the plurality of perforations.

10 Claims, 6 Drawing Sheets

(51) Int. Cl.

| | | |
|---|---|---|
| *E04F 13/18* | (2006.01) | |
| *E04F 13/08* | (2006.01) | |
| *E04F 13/16* | (2006.01) | |
| *E04B 2/88* | (2006.01) | |
| *E04F 13/072* | (2006.01) | |
| *B29C 51/10* | (2006.01) | |
| *B29K 105/12* | (2006.01) | |
| *B29L 31/10* | (2006.01) | |
| *B29L 31/00* | (2006.01) | |

(52) U.S. Cl.
CPC .... *B29L 2031/776* (2013.01); *Y10T 428/2495* (2015.01); *Y10T 428/24802* (2015.01); *Y10T 428/24934* (2015.01)

(56) References Cited

U.S. PATENT DOCUMENTS

| | | | | |
|---|---|---|---|---|
| 4,656,722 | A | | 4/1987 | Armstrong |
| 4,944,124 | A | | 7/1990 | Armstrong |
| 5,372,676 | A | | 12/1994 | Lowe |
| 5,745,971 | A | * | 5/1998 | Ohsawa .................. B29C 51/28 |
| | | | | 264/510 |
| 5,885,502 | A | | 3/1999 | DeAngelis et al. |
| 6,083,447 | A | | 7/2000 | Turner |
| 6,355,193 | B1 | | 3/2002 | Scott |
| 6,592,720 | B1 | * | 7/2003 | Nonomura ................ D21J 3/10 |
| | | | | 162/220 |
| 6,605,187 | B1 | | 8/2003 | Nonomura et al. |
| 6,857,199 | B2 | * | 2/2005 | Otani ....................... D21J 3/00 |
| | | | | 162/378 |
| 6,899,793 | B2 | * | 5/2005 | Nonomura ................ D21J 3/10 |
| | | | | 162/218 |
| 7,067,041 | B2 | | 6/2006 | Tsuura et al. |
| 7,582,190 | B2 | | 9/2009 | Salm |
| 7,587,871 | B2 | | 9/2009 | Perry |
| 7,909,964 | B2 | * | 3/2011 | Nilsson .................... D21J 7/00 |
| | | | | 162/218 |
| 7,931,248 | B2 | | 4/2011 | Korwin-Edson et al. |
| 9,988,767 | B2 | * | 6/2018 | Gumbert ............... E04F 13/165 |
| 2005/0150627 | A1 | | 7/2005 | Frawley et al. |
| 2005/0150624 | A1 | | 11/2005 | Toh et al. |
| 2007/0034346 | A1 | | 2/2007 | Salm |
| 2008/0155922 | A1 | | 7/2008 | Wolf et al. |
| 2008/0155938 | A1 | | 7/2008 | Attebery |
| 2009/0283235 | A1 | | 11/2009 | Salm |
| 2013/0216797 | A1 | | 8/2013 | Lerch et al. |

OTHER PUBLICATIONS

Pulp Art Surfaces, How It's Made, Faux brick, stone, cement block surface panels 100% recycled materials, http://pulpartsuifaces.com/pulp-1-2-3, Copyright 2011, 7 pages.

Pulp Art Surfaces, LLC, PAS 001—"Not So" Common Brick—installation instructions, www.pulpartsurfaces.com, 4024 Radford Ave, Mill # M1Studio City, CA 91604, phone 818 655-5804, fax 888 654-9325, 2 pages.

Pulp Art Surfaces, http://pulpartsurfaces.com, PAS004 "New" New York Brick, The Only Eco-Wall Skin, Copyright 2011, 6 pages.

MIO Company, LLC, Paperforms, Papertastic, http://mioculture.com/paperforms.html, 2010 MIO Company, LLC, telephone 215-925-9359, 2 pages.

Hamamoto, Toshimasa; Sisido, Masahiko; Ohtsuki Takashi; and Taki, Masumi, Synthesis of a cyclin peptide/protein using the NEXT—A reaction followed by cyclization, Chem. Commun., 2011, 47, 9116-9118.

Wikipedia, Expanded genetic code, dated May 15, 2015, 20 pages.

PCT Notification, Search Report and Written Opinion, International Application No. PCT/US2014/027143, dated Aug. 13, 2014, 11 pages.

Pulp Art Surfaces, PAS 007, May 27, 2011, pulpartsurfaces.com 1 page, May 27, 2011.

Pulp Art Surfaces, PAS 006, May 27, 2011, pulpartsurfaces.com 1 page, May 27, 2011.

Pulp Art Surfaces, "The Only Eco Wall Skin", pulpartsurfaces.com, May 27, 2011.

Pulp Art Surfaces, PAS 005, May 27, 2011, pulpartsurfaces.com 1 page, May 27, 2011.

Pulp Art Surfaces, PAS 004, May 27, 2011, pulpartsurfaces.com 1 page, May 27, 2011.

Pulp Art Surfaces, PAS 003, May 27, 2011, pulpartsurfaces.com 1 page, May 27, 2011.

Pulp Art Surfaces, PAS 002, May 27, 2011, pulpartsurfaces.com 1 page, May 27, 2011.

Pulp Art Surfaces Technical Guide, pulpartsurfaces.com, 7 pages, May 27, 2011.

Pulp Art Surfaces, Faux brick, stone, cement block surface panels 100% recycled materials, http://pulpartsurfaces.com/pulp-1-2-3, Copyright 2011, 5 pages.

Pulp Art Surfaces, PAS 008, May 27, 2011, pulpartsurfaces.com 1 page, May 27, 2011.

Pulp Art Surfaces, PAS 010, May 27, 2011, pulpartsurfaces.com 1 page, May 27, 2011.

CBS Studio Center Newsletter, Pulp Art Surfaces article, 6 pages, Dec. 2009.

Perspective Magazine, Pulp Art Surfaces article, 7 pages, Mar. 2010.

Wall Skin Facts, Pulp Art Surfaces, 6 pages, PAS 003—Mar. 25, 2010, PAS 004—Apr. 8, 2010, PAS 005—Aug. 17, 2010.

English translation of Notification of First Office Action, dated Nov. 21, 2016, 5 pages.

Chinese Office Action and English translation, dated Nov. 21, 2016, 9 pages.

EPO Office Action, dated May 2, 2017, 5 pages.

European Patent Office Communication, dated Oct. 6, 2017, 5 pages.

\* cited by examiner

APPARATUS FOR FORMING BLANKS FROM FIBROUS MATERIAL

CROSS-REFERENCE TO RELATED APPLICATIONS

This application is a continuation of patent application Ser. No. 15/097,405 filed on Apr. 13, 2016.

FIELD OF INVENTION

This invention relates to an apparatus for forming blanks and, in particular, an apparatus for forming blanks from fibrous material.

BACKGROUND

The practice of covering an interior wall or an exterior wall for aesthetic purposes (i.e. stone, brick, wood panels, tile, etc.) has traditionally involved standard masonry, carpentry, or finishing practices, where a stone mason, carpenter, or other finisher arranges stones, bricks, wood panels, tile or other decorative features onto the wall and sets them in place using mortar, paste, adhesive or nails. The process of arranging and adhering this facade, which may include random shapes and sizes, is tedious and requires substantial skill. As a result, attempts have been made to simulate such a trade using less expensive materials and less labor-intensive methods. One such attempt involves constructing a wall from concrete. The concrete may be molded to the shape of stone, bricks, tile, wood panels or other decorative feature. Another such example includes manually texturing the concrete before it cures. One problem with using concrete is that concrete tends to have a substantially smooth texture, unlike natural stone or brick. Another disadvantage with such concrete walls is that solid concrete is also extremely heavy.

In other attempts, wall facades have been manufactured from synthetic resins, such as a plastic, fiberglass, or styrene foams, which are formed to conform with the outer shape of the products to provide an appearance of masonry, carpentry, or other finishes. While plastic and styrene resin foams are light in weight and inexpensive to manufacture, their use is an environmental concern because they are not perishable and do not naturally decompose in landfills. Furthermore, these plastic facades are generally bulking and brittle.

One alternative material to plastics, which has been found to be suitable for use in packing or cushioning material, is a molding prepared from a mixture of water and paper, form a fibrous pulp slurry. The fibrous pulp slurry can be molded into finished articles having a plurality of contoured shapes. Such molded member are relatively inexpensive to produce in large quantities, are biodegradable, and are easy to work with. Accordingly, the use of such molding processes for faux facades is highly desirable.

Molded members formed from a fibrous slurry, such as a pulp slurry, are typically produced by the process of matting the slurry fibers onto one side of a forming die by first inserting the die into the slurry. A vacuum is then applied in such a manner that the water held in the slurry passes through a screen having perforations and through channels in the die. As a result a layer of wet fibers deposited on the die surface is left, and after sufficient water has been drawn to obtain the required thickness of the fiber layer, the die is removed from the slurry. The formed molded article can then be removed from the forming die, and then the molded member can be dried for further finishing and packaging.

One problem associated with producing large molded articles from a fibrous slurry, such as a wall covering panel member, is the need to prevent warping that may prevent the panel member from being a realistic.

SUMMARY

The present invention has been devised to solve the technical problems described above, and an object of the present invention, among others, is to provide an apparatus for forming blanks from fibrous material. The apparatus includes a die having a porous body with a plurality of perforations extending there through, the plurality of perforations having varying sizes and being layered from a top surface to a bottom surface of the porous body. A smooth molding surface is provided on the top surface to hold the fibrous material and allow water to drain from the fibrous material through the plurality of perforations.

BRIEF DESCRIPTION OF THE DRAWINGS

The invention will now be described by way of example with reference to the accompanying figures of which.

DETAILED DESCRIPTION OF THE EMBODIMENTS

Referring to FIGS. 1-4, a panel member 1 according to the invention is shown, having a body 10, a plurality of ornamental sections 12, a plurality of interior filler sections 14, an exterior filler section 16, and flashing 18 extending from the exterior filler section 16.

The panel member 1 is prepared from a uniform layer of fiber material, which may be paper or other fibrous material. In fact, there are numerous organic and inorganic materials, in fiber form, that may be used instead of or included with paper fibers in a fiber material for the panel member. In one embodiment, the fiber material is originally a pulp slurry using pre- and post-consumer newsprint, kraft paper and other selected waste papers which are fed into a pulping machine and mixed with water. The recycled paper is reduced to small pieces and then further defibered into a homogenized slurry of paper and water. During defibering, dry pulp sheets or paper are added with water and continuously agitated such that the dry pulp sheets or clean recycle paper sheets are broken down and separated into fibers, that is, to separate all of the fibers. Other additives may also combined with the slurry, including sizing agents (i.e. waxes) and binders to ensure proper binding of all the additives. It is also possible to use other fibrous materials. However, using 100% pre- and post-consumer newsprint, kraft paper and other selected waste papers, the panel member 1 remains economical and environmentally friendly. As a result, the panel members 1 are lightweight and quite manageable; the panel member 1 may be recycled in a convenient manner.

The panel member 1 may be provided in various shapes, sizes and thicknesses. In the embodiment shown, the panel member 1 is substantially 4'½" long and 5'-10" wide. As a result, the panel member 1 should be thick enough so the panel member 1 can be easily manageable for installation onto a wall or ceiling. Furthermore, the thickness will affect any warping once the panel member 1 is installed. Accordingly, the panel member 1, as shown, includes a nominal caliper of ¼".

The body 10 is formed from a dried slurry, and includes an upper surface 10a that is smooth and a lower surface 10b that is left naturally rough. This shape and roughness is dependent and results from the molding process, which is described in more detail below. The thickness of the upper and lower surfaces 10a, 10b are controlled by the molding process. However, depending on the shape of the ornamental sections 12, which depends on the type of brick, rock, wood, or other facade surfaces being replicated, the body 10 may have more or less relief, which provides better replication of masonry, carpentry, or other finishes.

Figure 1:
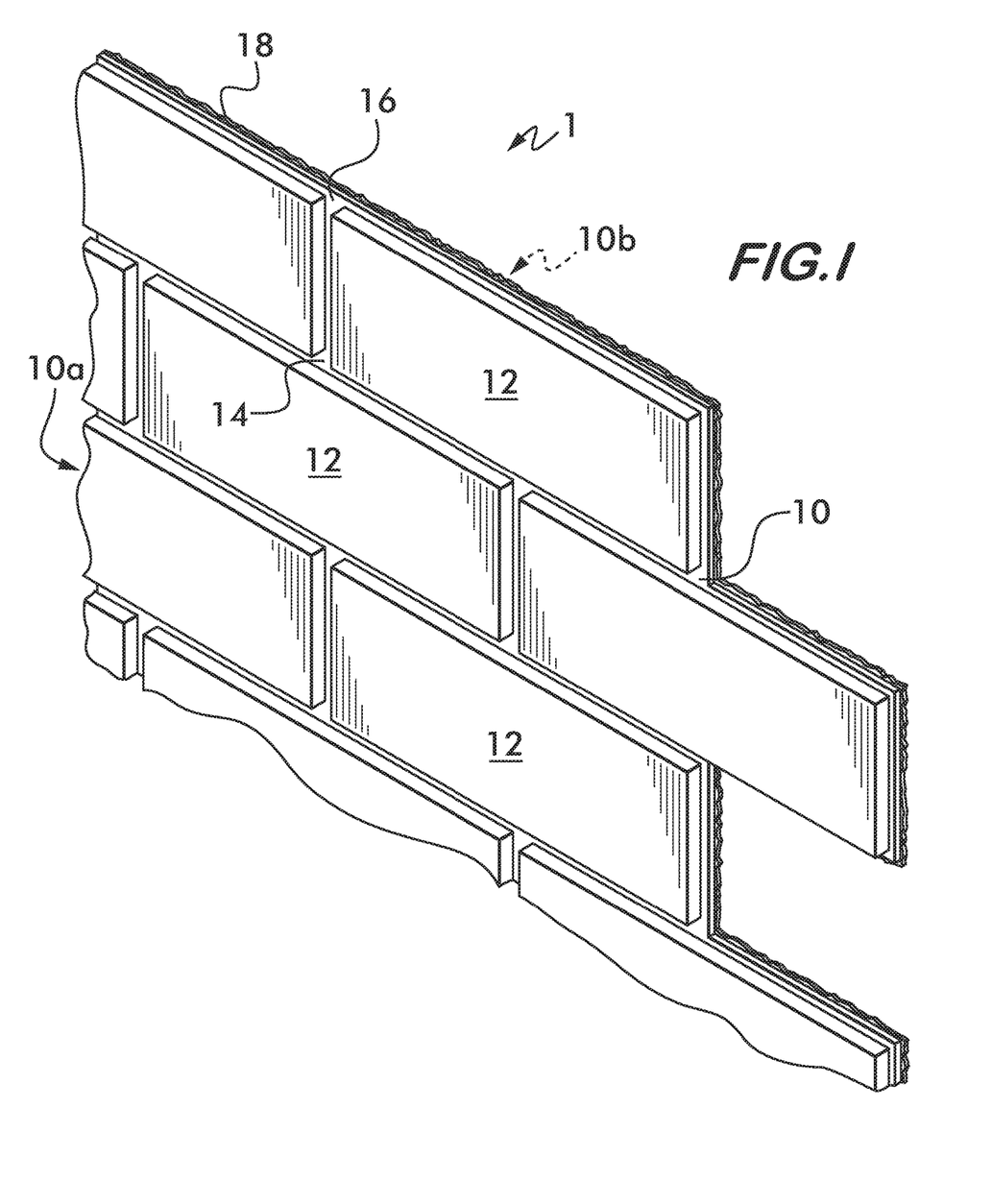
FIG. 1 is a close-up perspective view of a panel member according to the invention.
Figure 2:
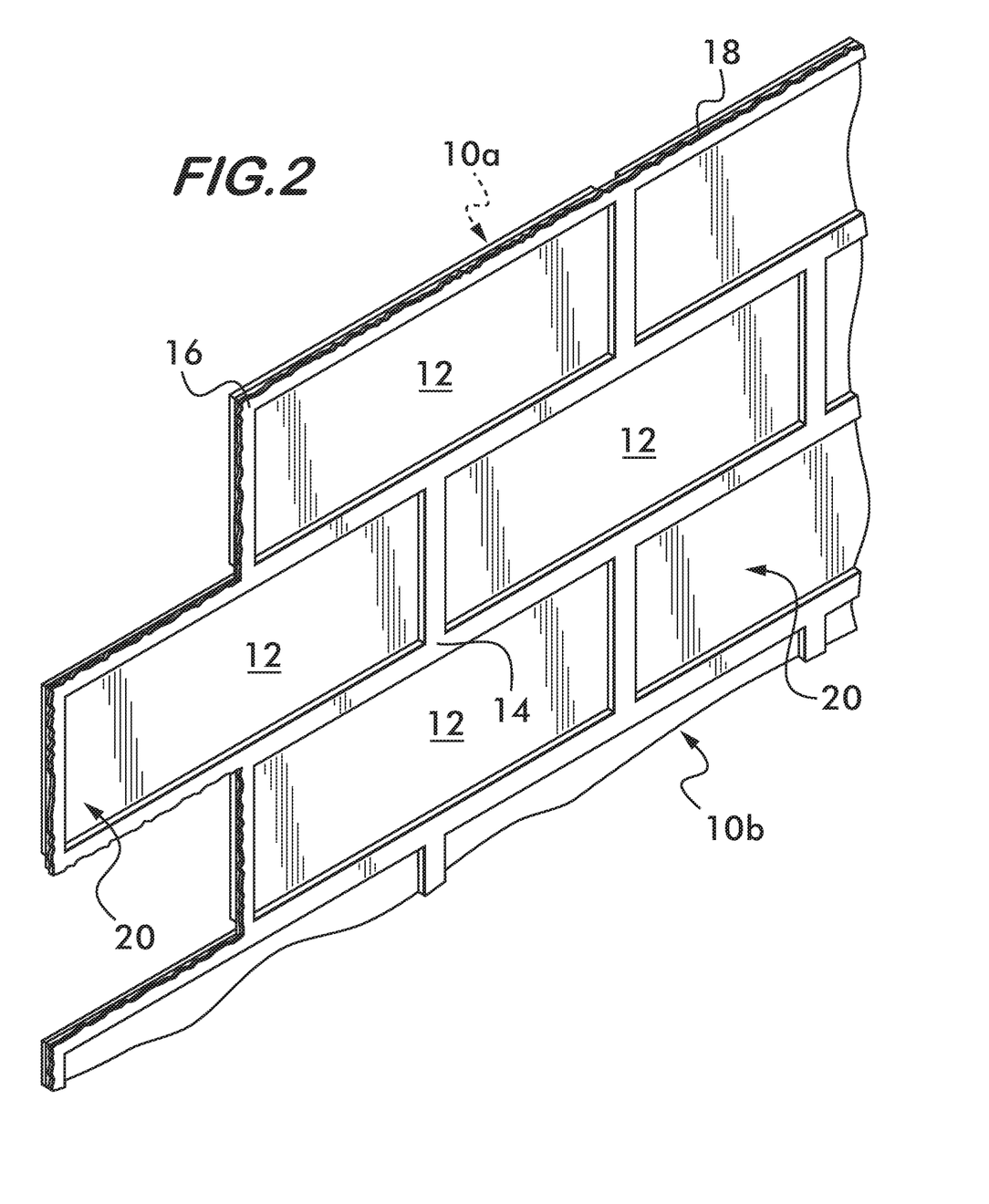
FIG. 2 is a close-up perspective view of the panel member in FIG. 1, showing a rear surface.

As shown in FIG. 1, the ornamental sections 12 extend outward from the interior and exterior filler sections 14, 16 and are formed in the shape of blocks, stone, wood panels, or other decorative features. This provides an appearance that the ornamental sections 12 are separate and/or bound together by connecting seams (i.e. mortar, grout, or other known seams), which is replicated by the interior and exterior filler sections 14, 16. In the alternative, the interior and exterior filler sections 14, 16 may be positioned between the ornamental sections 12 such that replicate an appearance is prepared wherein the ornamental sections 12 seem bound together through a seamless connection (i.e. floating floor tiles, tin panels, etc.).

In FIGS. 1-4, the panel member 1 has ornamental sections 12 shaped as bricks, while the interior and exterior filler sections 14, 16 are shaped and dimensions to replicate brick mortar, having a straight lines and uniform dimensions (i.e. uniform grid pattern). Other materials, which are commonly used in building structures and having ornamental features, may be replicated, including granite, travertine, limestone, concrete block, glass block, stucco, tile, metal panels, or even timber. In other embodiments, the interior and exterior filler sections 14, 16 are formed to replicate grout, paste, concrete grout, or other spacing features known between the ornamental sections 12. As discussed above, in the alternative, the interior and exterior filler sections 14, 16 may replicate the appearance of a seamless connection (i.e. floating floor tiles, tin panels, etc.).

Figure 5:
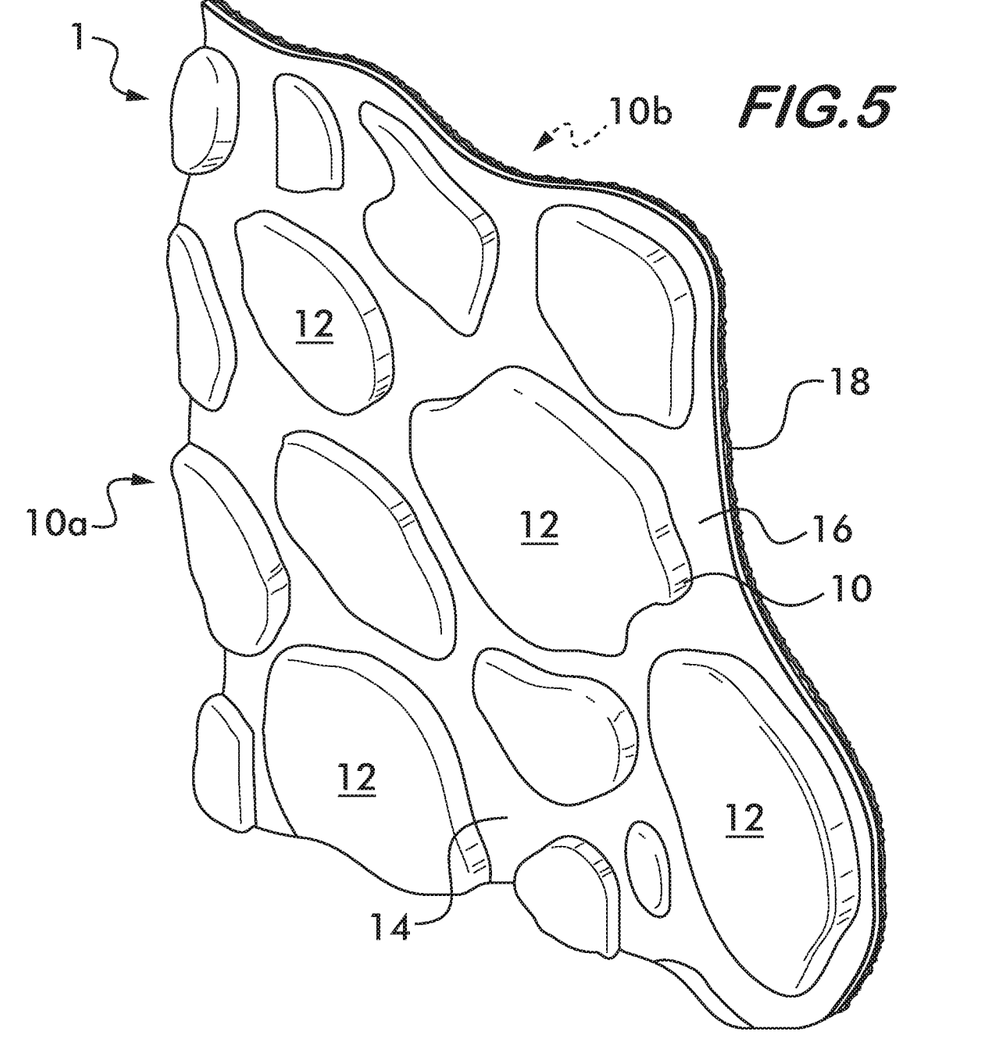
FIG. 5 is a close-up perspective view of another panel member according to the invention.
Figure 6:
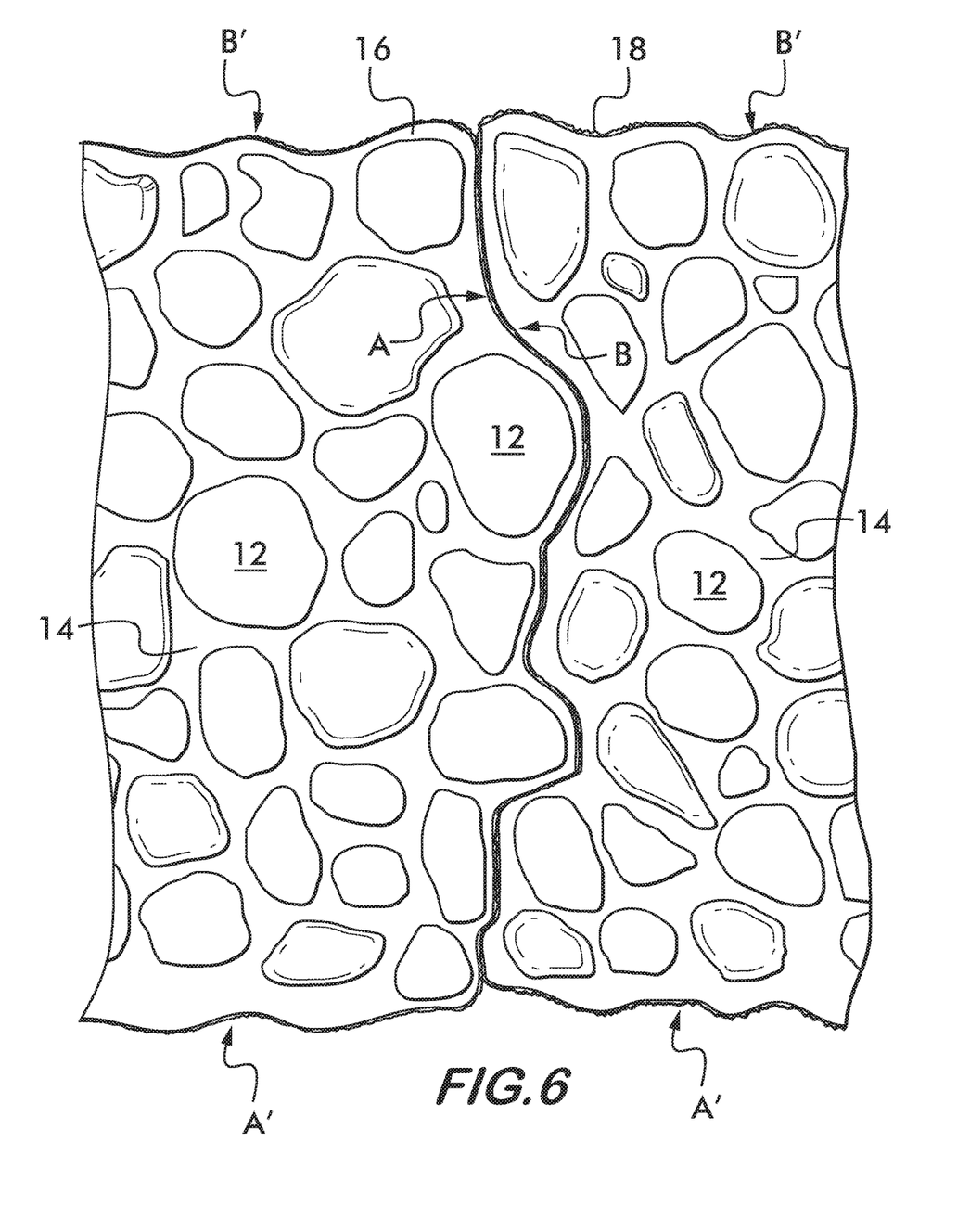
FIG. 6 is a front view of connecting panel members according to FIG. 5, showing interlocking sections between the panel members.

While the ornamental sections 12 are generally symmetrical in the embodiment shown, the ornamental sections 12 may be arranged in different shapes. For instance, the ornamental sections 12 may replicate bricks laid in a variety of 'bonds' or patterns of headers and stretchers on a series of courses, tile, or wood panels pieced together in a specific pattern. It is also possible that the ornamentals sections are molded like ceramic tile with grout there between. The ornamental sections 12 may be shaped differently. In FIGS. 5 and 6, the ornamental sections 12 are shaped like rock sections of a stone wall, having irregularity in shape, surface relief, and texture. The interior and exterior filler sections 14, 16 are more irregular in shape than the interior and exterior filler sections 14, 16 in FIGS. 1-4, and replicate a mortar mix and design commonly used in the stone wall masonry.

With reference back to FIG. 2, the ornamental sections 12 are hollow, and a cavity 20 is formed along the lower surface 10b of the body 10 and between the interior and exterior filler sections 14, 16. This allows the panel member 1 overall weight to be reduced, which makes the panel member 1 more manageable to install. However, since the overall weight of panel member 1 is reduced, the panel member 1 becomes more susceptible to becoming warped that provides a poor appearance of replication. As a result, the filler sections 14, 16 are structured and dimensioned to provide support to the panel member 1 and minimize warping. As discussed, the interior and exterior filler sections 14, 16 are formed to replicate grout, paste, concrete, or spacing between the ornamental sections 12.

In the embodiment shown, the interior filler sections 14 and the exterior filler sections 16 are generally the same thickness. However, according to the invention, the thickness of the exterior filler sections 16 cannot be larger than the thickness Tg of the interior filler sections 14. If the exterior grout lines 16 are thicker, then the panel member 1 warps. Additionally, the thickness of the exterior filler sections 16 cannot be smaller than the thickness Tg of the interior filler sections 14. If the exterior grout lines 16 is substantially smaller, then the panel member 1 warps also, such that an interior section of the body 10 either bows in or out depending on this design and variation, which provides a poor appearance and the panel member does not look like a wall prepared from masonry. As shown in FIG. 4, the interior filler section thickness Tg is substantially equal to the ornamental section thickness To, which results from the ornamentals sections 12 being hollow and the molding process as further detailed below. The body thickness Tb is measured from the upper surface 10a to the lower surface 10b, and is equal to the interior filler section thickness Tg and the ornamental section thickness To, since the flashing 18 is an extension from the exterior filler section 16 and directed parallel to the upper and lower surfaces 10a, 10b of the body 10.

Generally, flash is formed during the molding process, which is excess material attached to a molded, forged, or cast product, which must usually be removed. This is typically caused by leakage of the material between the two surfaces of a mold or between the base material and the mold.

While the exterior filler section 16 thickness is substantially equal to a thickness of the interior filler sections 14, the exterior filler section 16 width $W_e$ is less than the interior filler sections 14 with $W_i$. As shown in FIG. 4, since the flashing 18 is directed away from the exterior filler section 16, connection between adjacent panel members 1 may be hindered or forcibly limited by the width of the flashing 18 and exterior filler section 16. Accordingly, the exterior filler section 16 width $W_e$ is limited to substantially half that of the interior filler section 14 width $W_i$. However, it is possible that other dimensions are possible, as long as the exterior filler section 16 width $W_e$ is less than that of the interior filler section 14 width $W_i$.

When molding the panel member 1 from a fibrous slurry, flash will develop, like most molding processes. In most instances, where one mold is used, a flashing is generally directed perpendicular with respect to the to the upper and lower surfaces 10a, 10b of the body 10. This creates an uneven installation surface against a wall, ceiling, or other structure, because the flashing is not uniform and does not allow the panel member 1 to lay flat.

The process of removing flash, known as deflashing, is commonly performed via cutting, breaking, grinding, or tumbling. Some foundries use robot autogrinders to remove this unwanted material. However, removal of the flashing requires additional steps which are cumbersome, time consuming, and expensive. In the embodiment shown and according to the invention, the flashing 18 is directed parallel to a planar upper surface 10a of the body 10. The flashing 18 does not affect the warping because the flashing 18 is directed away from the body 10 and is small enough to not impede connection between the adjacent panel members 1, considering that the exterior filler section 16 width $W_e$ is less than that of the interior filler section 14 width $W_i$.

Figure 3:
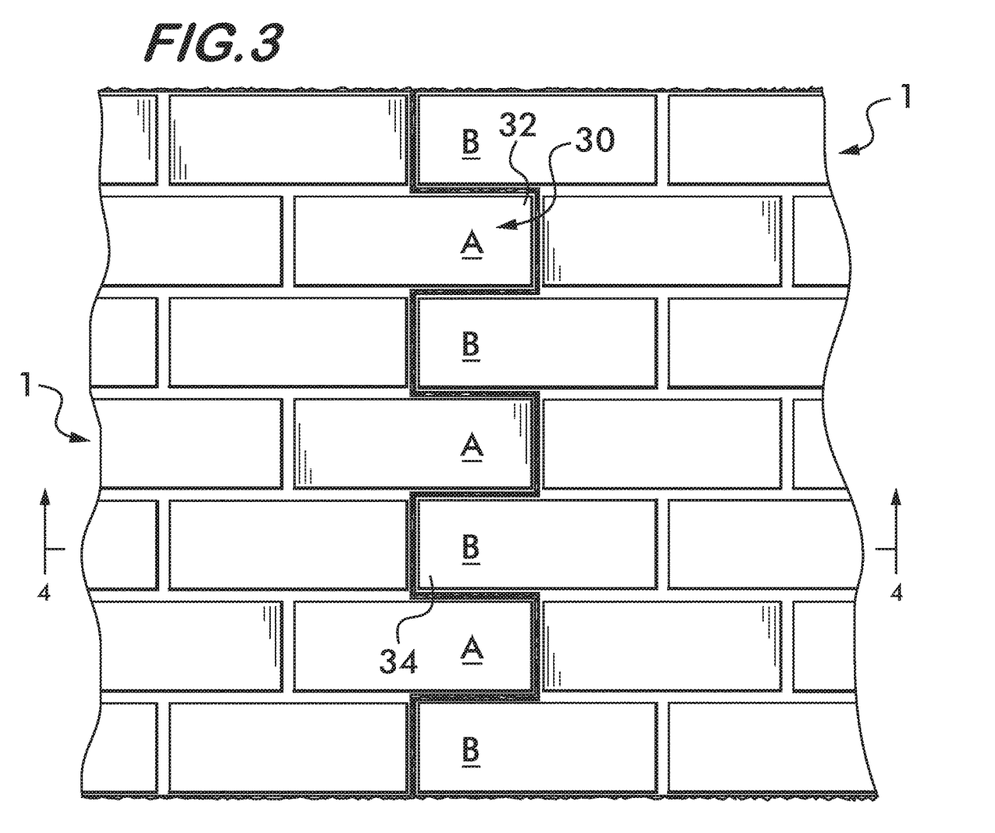
FIG. 3 is a front view of connecting panel members according to the invention, showing interlocking joints between the panel members.
Figure 4:
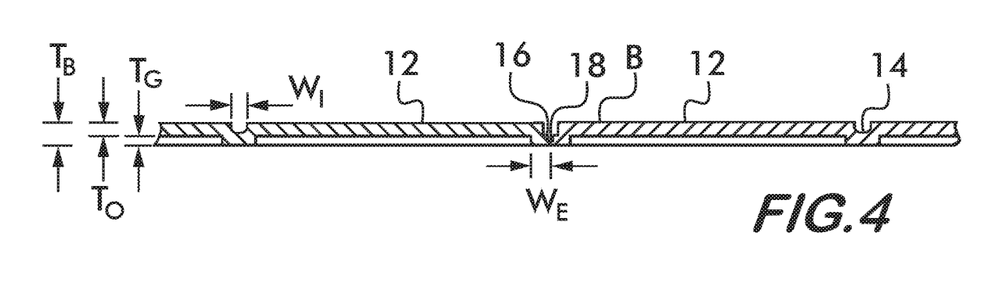
FIG. 4 is a sectional view of the connecting panel members, along the 4-4 line.

With reference to FIGS. 3 and 4, panel members 1 are shown connecting to each other.

For each panel member 1, opposing sides (not top or lower surfaces 10a, 10b) have either a first connection section A or a second connection section B. The first connection section A is keyed to connection section B, and vice versa. Accordingly, when the first connection section A of one panel member is positioned adjacent to a second connection section B of another panel member 1, then the first and second connection sections A, B come together, and compliment a connection between the connecting panel members 1.

As shown, the first and second connection sections A, B include finger joints 30, which are complementary rectangular protrusions 32 and cuts outs 34, which interlock finger joints 30 in an adjacent panel member 1. Again, since the flashing 18 is directed parallel to a planar upper surface 10a of the body 10 and minimized, and the exterior filler section 16 width $W_e$ is less than that of the interior filler section 14 width $W_i$, the first and second connection sections A, B of adjacent panel members 1 can be performed, and provide a realistic look of a structure prepared from masonry, carpentry, or other finishes.

With respect to FIGS. 5 and 6, another embodiment of the invention is shown, wherein the panel member 1 includes body 10, a plurality of ornamental sections 12, a plurality of interior filler sections 14, an exterior filler section 16, and flashing 18 extending from the exterior filler section 16, but the first and second connection sections A, B are profiled differently than the embodiment shown in the FIGS. 1-4. In fact, the first and second connection sections A, B may be a keyed profile side, that match a corresponding first and second connection section A, B from an adjacent panel member 1 when positioned next to each other. There are no finger joints 30.

For panel members 1, which have a more grid pattern, it is possible to only have two connection sections A, B, on opposing sides of the panel member. However, as shown in FIGS. 5 and 6, the panel member may have first and second connection sections A, B positioned on all sides of the body 10. As a result, a panel member 1 that replicates a stone wall, for instance, could match with adjacent panel members 1 in different ways, creating a less uniform and consistent look.

Figure 7:
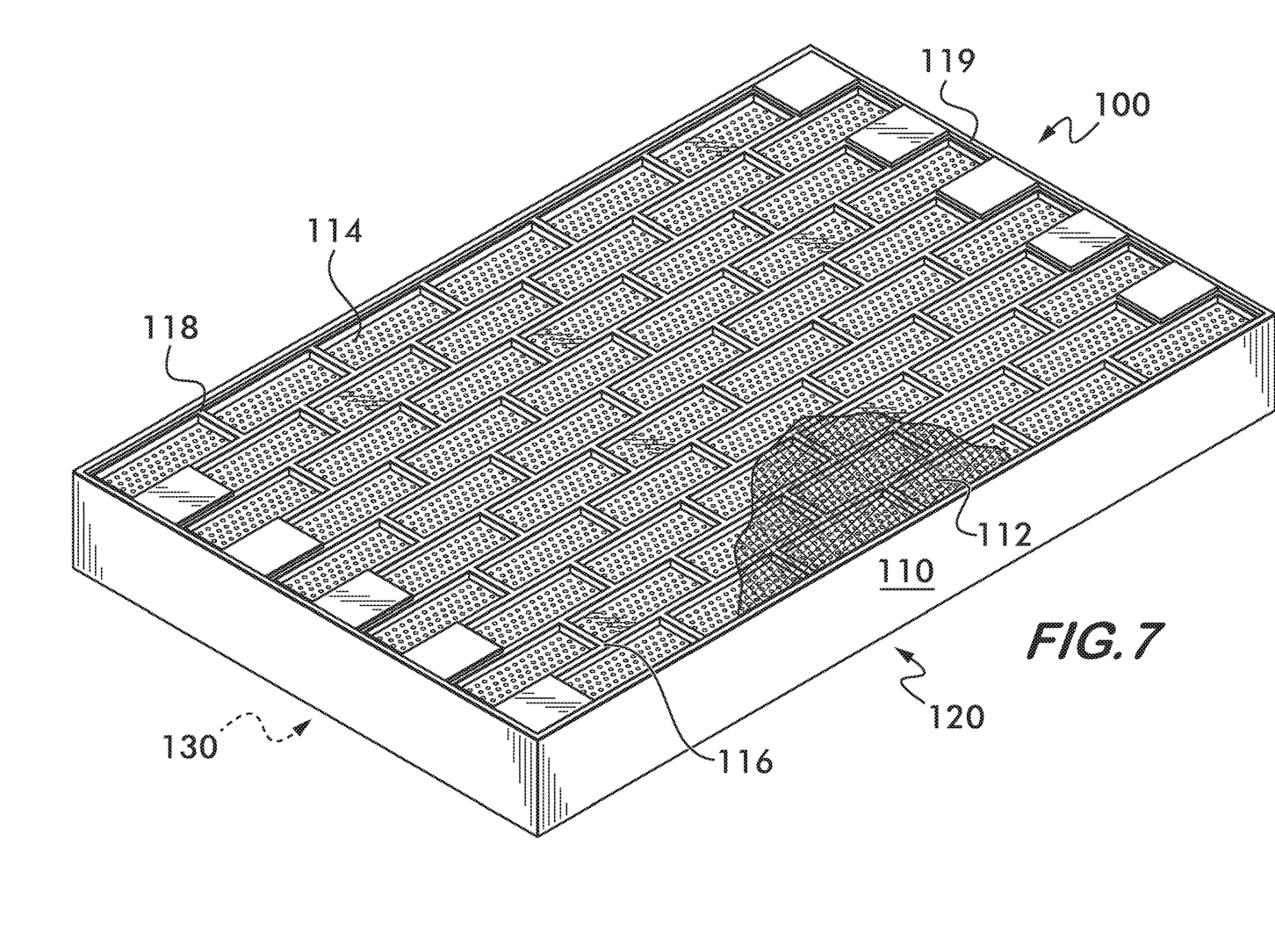
FIG. 7 is a perspective view of a mold used to prepare a panel member according to the invention.

Referring now to FIG. 7, the apparatus for molding panel members 1 from a fibrous slurry, generally designated 100, of the subject invention is shown comprising a die 110 having molding screen 112, and a vacuum mechanism 130 for drawing slurry into the die 110 and further extracting water away from the slurry.

The die 110 may be formed from any material having the characteristics of being water-insoluble and porous. The material must also be sufficiently rigid to withstand the required vacuum pressures and easily shaped to permit the molding surfaces of the die 110, contrary to the accepted practice, to be constructed either by hand using simple hand-held cutting tools, or by machine using relatively simple manual tools, or automatically using computer controlled cutting tools. Such materials include, but are not limited to, phenol-formaldehyde resin foams, polyurethane resin foams, and urea-formaldehyde resin foams; ceramics; foam metals; and other similar materials. Accordingly, the die 110 of the invention may be manufactured with significantly less time and cost than conventional forming dies which require relatively labor intensive, time consuming, and expensive molding, machining and drilling, or electroforming operations. Further, it should now be apparent that the use of materials having the above-described characteristics permits the die 110 of the invention to be easily and inexpensively modified to allow for formed articles to be manufactured incorporating various design changes.

In the embodiment shown, the die 110 includes a screen 112 and a plurality of perforations 114 extending inward and through the die 110. These perforations 114 lead through the die 110 as a channel that then connects with the vacuum mechanism 130.

The screen 112 is a fine mesh that provide a smooth upper surface 10A of the body 10, and allows the water to pass through the perforations 114 when sucked by the vacuum mechanism 130. The screen 112 prevents the fiber material from also being sucked through the perforations. The screen 112, the perforations 114, and the vacuum mechanism 130 allow the fiber material to mold to the die 110 surface and then remove enough water from the fiber material to allow the molded fibers to self support itself once it is removed from the die 110.

The die 110 also includes interior filler walls 116, exterior filler walls 118, and a support wall 119. The interior filler walls 116 form the interior filler sections 14, while the exterior filler walls 118 form exterior filler sections 16. In accordance with the description above, the interior filler sections 14 and the exterior filler sections 16 are generally the same thickness, and so do the interior filler walls 116 and the exterior filler walls 118. However, according to the invention, the thickness of the exterior filler sections 16 cannot be larger than the thickness Tg of the interior filler sections 14. If the exterior grout lines 16 are thicker, then the panel member 1 warps, such that an interior section of the body 10 either bows in or out, which provides a poor appearance and the panel member 1 does not look like a wall or façade prepared from masonry, carpentry, or other finishes. Therefore, the exterior filler walls 118 must have less or equal height than the interior filler walls 116. Furthermore, the exterior filler walls 118 should have a width less than the width of the interior filler walls 116. The upper surface 10a of the body 10 is formed along the screen 112, and the cavities 20 are formed between the interior filler walls 116.

The support wall 119 is formed on the external wall of the die 110 and determines the height and shape of the flash. Accordingly, the support wall 119 height is limited to the height less than the height of the exterior filler wall 118. The flashing 18, as a result, is limited in height and directed parallel to the upper and lower surfaces 10a, 10b of the body 10.

According to the method of producing panel members 1 from a fibrous slurry of the invention, a die 110 comprising a water insoluble, porous (i.e. screen 112 and perforations 114), and relatively rigid and easily shaped material is provided, having a molded surface through a series of walls that replicates a structure prepared from masonry, carpentry, or other finishes. The die 110 is then disposed into a vat having a fibrous slurry. The vacuum mechanism 130, connected to the die 110, draws the fibrous slurry against the screen 112 and molding surface of the die 110 to form a substantially uniform layer of fibrous material. The water is drawn through the perforations 114 in the die 110. The vacuum pressure necessary for drawing the fibrous slurry against the molding surfaces of the forming die may be readily determined by one of ordinary skill in the art and will depend on various process conditions such as the composition and viscosity of the slurry, the temperature of the slurry, and the configuration and wall thickness of the article to be produced.

In one embodiment, when a fibrous layer has been deposited at the desired thickness, the body 10 is formed and the panel member 1 is permitted to dry. After the panel member 1 has dried sufficiently, it may be removed from the die 110 by hand or mechanically with the application of air pressure through the die 110 to push the panel member 1 away from the die 110. In order to reduce drying time, the panel member 1 may be placed into a conventional oven having a temperature of less than about 500 degrees. The amount of time and the particular heating temperature may be readily determined by one of ordinary skill in the art.

Although several embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An apparatus for forming blanks from fibrous material, comprising:

a die configured to be inserted into a slurry of fibrous material, and having a molding screen and a porous body with a plurality of perforations extending there through;

wherein said molding screen presents a smooth molding surface provided on the top surface to hold the fibrous material and allow water to drain from the fibrous material through the plurality of perforations.

2. The apparatus of claim 1, wherein said plurality of perforations of said porous body includes plurality of passageways configured to draw away water from said fibrous material held by said molding screen.

3. The apparatus of claim 2, wherein said molding screen is configured to prevent the passage of the fibrous material there through.

4. The apparatus of claim 1, further comprising a vacuum mechanism extracting water away from the fibrous material through the plurality of perforations.

5. The apparatus according to claim 1, wherein the die further includes interior filler walls, exterior filler walls, and a support wall.

6. The apparatus according to claim 5, wherein the interior filler walls form interior filler sections and exterior filler sections of the blank.

7. The apparatus according to claim 6, wherein the interior filler walls have a greater thickness than the exterior filler walls.

8. The apparatus according to claim 7, wherein the exterior filler walls height is less than or equal to the height of the interior filler walls.

9. The apparatus according to claim 8, wherein the support wall height is less than the height of the exterior filler wall.

10. The apparatus according to claim 1, wherein the screen comprises a fine mesh.

* * * * *